(12) United States Patent
Bäck et al.

(10) Patent No.: US 7,660,585 B2
(45) Date of Patent: *Feb. 9, 2010

(54) INTER-SYSTEM HANDOVER

(75) Inventors: Juha Bäck, Espoo (FI); Tony Hulkkonen, Espoo (FI); Kati Vainola, Espoo (FI)

(73) Assignee: Nokia Corporation, Espoo (FI)

( * ) Notice: Subject to any disclaimer, the term of this patent is extended or adjusted under 35 U.S.C. 154(b) by 363 days.

This patent is subject to a terminal disclaimer.

(21) Appl. No.: 11/478,215

(22) Filed: Jun. 29, 2006

(65) Prior Publication Data

US 2006/0246902 A1 Nov. 2, 2006

Related U.S. Application Data

(63) Continuation of application No. 10/049,007, filed as application No. PCT/IB00/01180 on Aug. 3, 2000, now Pat. No. 7,089,008.

(30) Foreign Application Priority Data

Aug. 6, 1999 (GB) ................. 99186363.3

(51) Int. Cl.
*H04M 1/00* (2006.01)
*H04Q 7/20* (2006.01)

(52) U.S. Cl. .............. 455/437; 455/440; 455/442; 455/552.1; 455/432.1; 455/438; 455/439; 370/331

(58) Field of Classification Search .............. 455/432.1, 455/437–439, 440, 442, 552.1; 370/331
See application file for complete search history.

(56) References Cited

U.S. PATENT DOCUMENTS

| 5,878,343 | A * | 3/1999 | Robert et al. | 455/424 |
| 5,946,634 | A * | 8/1999 | Korpela | 455/552.1 |
| 6,134,443 | A * | 10/2000 | Spann et al. | 455/450 |
| 6,574,473 | B2 * | 6/2003 | Rinne et al. | 455/436 |
| 6,671,507 | B1 * | 12/2003 | Vinck | 455/411 |
| 6,771,964 | B1 * | 8/2004 | Einola et al. | 455/437 |
| 6,792,283 | B1 * | 9/2004 | Roberts et al. | 455/525 |
| 6,963,745 | B2 * | 11/2005 | Singh et al. | 455/437 |
| 7,403,621 | B2 * | 7/2008 | Vialen et al. | 380/272 |
| 2002/0071480 | A1 * | 6/2002 | Marjelund et al. | 375/141 |
| 2006/0148475 | A1 * | 7/2006 | Spear et al. | 455/436 |
| 2008/0014941 | A1 * | 1/2008 | Catovic et al. | 455/436 |
| 2008/0037483 | A1 * | 2/2008 | Ali et al. | 370/338 |
| 2008/0305800 | A1 * | 12/2008 | Sharp et al. | 455/438 |

* cited by examiner

*Primary Examiner*—Olisa Anwah
*Assistant Examiner*—Lisa Hashem
(74) *Attorney, Agent, or Firm*—Cohen Pontani Lieberman & Pavane LLP

(57) ABSTRACT

A method for performing an inter-system handover of a user terminal in a telecommunications network comprising a first telecommunications system operable according to a first protocol and comprising a first service subsystem and a first access subsystem and a second telecommunications system operable according to a second protocol and comprising a second service subsystem and a second access subsystem; the user terminal storing capability data indicative of the user terminal's capabilities for communication with the service subsystems and the access subsystems.

20 Claims, 7 Drawing Sheets

UMTS AN; UMTS CN

UMTS CN; GSM AN

INTER-SYSTEM HANDOVER

CROSS REFERENCE TO RELATED APPLICATIONS

This application is a continuation of U.S. patent application Ser. No. 10/049,007 which was filed with the U.S. Patent and Trademark Office on May 3, 2002, now U.S. Pat. 7,089,008 which is a national stage of PCT application No. PCT/IB00/01180, filed on Aug. 3, 2000. Priority is claimed on patent application no. 99186363.3 filed in Great Britain on Aug. 6, 1999.

BACKGROUND OF THE INVENTION

1. Field of the Invention

This invention relates to a method and apparatus for performing inter-system handover between telecommunications systems, and especially to the handling of classmarks or like indicators.

In a mobile radio telecommunications system user's terminals communicate by radio with base stations which are connected to control units which control the operation of the mobile radio system and to the wider telecommunications network. The user terminal is often referred to as a mobile station (MS) which could be a mobile phone; however, the location of the MS could be fixed.

FIG. 1 shows schematically the configuration of a typical cellular radio telecommunications network. The network comprises a number of base-stations (BSs) 1, 2, 3 etc. Each base-station has a radio transceiver capable of transmitting radio signals to and receiving radio signals from the area of a cell 4, 5 etc. next to the base-station. By means of these signals the base-station can communicate with a mobile station (MS) 6 in that cell, which itself includes a radio transceiver. Each base station is connected via a base station controller (BSC) 9 to a mobile switching centre (MSC) 7, which is linked in turn to the public telephone network 8. By means of this system a user of the MS 6 can establish a telephone call to the public network 8 via the BS in whose cell the MS is located.

The location of the MS could be fixed (for example if it is providing radio communications for a fixed building) or the MS could be moveable (for example if it is a hand portable transceiver or "mobile phone"). When the MS is moveable it may move between cells of the cellular radio system. As it moves from one cell (the "old cell") to another cell (the "new cell") there is a need to hand it over from communication with the BS of the old cell to the BS of the new cell without dropping the call due to a break in communications between the mobile station and the network. This process is known as handover. A need can also arise to hand over a MS whose location is fixed, for example if atmospheric conditions affect its communications with the old BS and call quality can be improved by handing it over to another BS or if there is a need to free up capacity of the old BS.

In a conventional cellular radio system handover is controlled by the BSC. Handover can be initiated by the network dependent, for example, on the quality of the signalling between the MS and the old and new BSs.

When a mobile station first established connection with the radio system, which could happen when it is turned or moves into an area of radio coverage of one of the base stations, the mobile station may send a message to the radio system to report its capabilities so as to allow the system to properly accommodate the mobile station.

In the GSM (Global System for Mobile Telecommunications) telecommunications system the reporting of such capabilities is done by way of messages indicating classmark information. In the GSM system the classmark information is divided into three separate classmark parameters, each of which includes information related both to the radio system and to the core network. One of these parameters is the MS classmark 2 parameter. That parameter is sent to the network in the paging response message (which a mobile station sends in response to a paging request message from the GSM network) or in the CM (connection management) service request message. Another of the parameters is the MS classmark 3 parameter. That parameter is sent in response to an enquiry from the mobile switching centre (MSC) of the GSM network (which is generally only made when the information is needed, for example to find the mobile station's encryption capabilities), or spontaneously if the MS supports services indicated in classmark 3.

In the proposed UMTS (Universal Mobile Telecommunications System) telecommunications system it is proposed that the classmark information will be rearranged into only two parameters: an access network classmark parameter (known as the AN classmark) and a core network classmark parameter (known as the CN classmark). This has been proposed because in the proposed UMTS system there is to be a clearer distinction between the radio access network and the core network than there is in the GSM system, and because the UMTS system is not to be subject to the restrictions on message size for classmark parameters that are enforced in the GSM system. An additional difference is that certain information in the GSM classmark that is specific to the GSM system is not required in the UMTS classmark. Similarly, the UMTS classmark includes additional information that is not present in the GSM classmark.

When a new cellular network is being introduced it can take some time to install all the base-stations and associated apparatus. Therefore, there is a delay before the new network provides full geographical coverage. FIG. 2 illustrates the situation: an existing cellular network provides full geographical coverage by means of cells 20-27 but the new cellular network provides incomplete geographical coverage by means of only cells 28 and 29. This presents a significant commercial problem for the operator of the new network. If the new network is launched for use before its geographical coverage is complete then customers will be dissatisfied by its inferior coverage to the old network. However, the cost of the infrastructure of the new network is high and no return can be gained on it until it is in use.

It has been proposed to tackle this problem by allowing mobile stations using the new network to be handed over to cells of the old network when they move outside the coverage of the new network. For instance, when a mobile station moves from 30 to 31 in FIG. 2 it could be handed over from the base station of cell 28 (in the new network) to that of cell 21 (in the old network). This is known as inter-system handover.

To allow the UMTS system to be introduced smoothly and without significant disruption to current users of the GSM system it is proposed that the new UMTS system will be capable of a substantial level of interworking with the existing GSM system. One aspect of this is the aim to support inter-system handover of a mobile station between the GSM and UMTS systems. However, the differences in the treatment of classmarks between the GSM and UMTS systems presents a significant barrier to inter-system handover. In order to allow for inter-system handover between the UMTS system and the GSM system there is a need to address the differences between the GSM and UMTS classmark arrangements. One way that has been proposed to address these differences is for the mobile station to provide all its classmark information (for both GSM and UMTS) to the network in all circumstances. However, this would increase signalling load unnecessarily in cases when no inter-system handover is subsequently performed.

There is therefore a need for an improved method of dealing with data such as classmark information for facilitating inter-system handovers.

SUMMARY OF THE INVENTION

According to one aspect of the present invention there is provided a method for performing an inter-system handover of a user terminal in a telecommunications network comprising a first telecommunications system operable according to a first protocol and comprising a first service subsystem and a first access subsystem and a second telecommunications system operable according to a second protocol and comprising a second service subsystem and a second access subsystem; the user terminal storing capability data indicative of the user terminal's capabilities for communication with the service subsystems and the access subsystems; and the method comprising performing the following steps: the user terminal transmitting to the said one of the first and second access subsystems initial capability data indicative of the user terminal's capabilities for communication with the first service subsystem and the said one of the first and second access subsystems; the said one of the first and second access subsystems transmitting to the first service subsystem the initial capability data that is indicative of the user terminal's capabilities for communication with the first service subsystem; establishing the connection between the user terminal and the first service subsystem via the said one of the first and second access subsystems by means of the initial capability data; determining that a handover of the connection is to be performed from the first service subsystem to the second service subsystem or from the said one of the first and second access subsystems to the other of the first and second access subsystems; the user terminal transmitting to the network further capability data indicative of the user terminal's capabilities for communication with the second service subsystem or the other of the first and second access subsystems; and handing over the connection by means of the further capability data.

According to a second aspect of the present invention there is provided telecommunications apparatus comprising: a telecommunications network comprising a first telecommunications system operable according to a first protocol and comprising a first service subsystem and a first access subsystem and a second telecommunications system operable according to a second protocol and comprising a second service subsystem and a second access subsystem; and a user terminal for storing capability data indicative of the user terminal's capabilities for communication with the service subsystems and the access subsystems; the telecommunications apparatus being adapted to perform an inter-system handover by the following steps: the user terminal transmitting to the said one of the first and second access subsystems initial capability data indicative of the user terminal's capabilities for communication with the first service subsystem and the said one of the first and second access subsystems; the said one of the first and second access subsystems transmitting to the first service subsystem the initial capability data that is indicative of the user terminal's capabilities for communication with the first service subsystem; establishing the connection between the user terminal and the first service subsystem via the said one of the first and second access subsystems by means of the initial capability data; determining that a handover of the connection is to be performed from the first service subsystem to the second service subsystem or from the said one of the first and second access subsystems to the other of the first and second access subsystems; the user terminal transmitting to the network further capability data indicative of the user terminal's capabilities for communication with the second service subsystem or the other of the first and second access subsystems; and handing over the connection by means of the further capability data.

The capability data is preferably classmark information.

The said connection is suitably a traffic connection. The said connection is preferably capable of carrying traffic data such as a user's voice or data communications.

The method preferably comprises a step of causing the further capability data to be transmitted in anticipation of a handover, suitably to allow the handover itself to be performed more quickly whilst reducing any need to unnecessarily transmit the further capability data. The method may comprise the step of monitoring at least one condition indicative of a need for the said handover, and initiating the said transmission by the user terminal of the further capability data when the said condition is beyond a threshold. The said condition is suitably based on the signal to interference ratio of the connection, although other factors may be used instead or in addition. The said step of initiating the said transmission by the user terminal of the first capability data is preferably performed when the said signal to interference ratio falls below the threshold. Alternatively, or in addition, handover may be anticipated when other events in the system occur, for example when the user terminal detects transmissions from a nearby access subsystem of another system to that to which it is connected. If the user terminal is a mobile station of a cellular telephone network then such a circumstance may arise when the mobile station starts to measure neighbor cells belonging to another type of radio access system than the one it currently communicates with.

The method may comprise the step of monitoring at least one condition indicative of a need for the said handover, and initiating the handover when the said condition is beyond a second threshold. The second threshold is preferably beyond the first threshold, so that the further information may be transmitted in advance of the handover itself being initiated.

The service subsystems are suitably capable of providing telecommunication service to the user terminal. The service subsystems may be core networks. The access subsystems are suitably capable of providing the user terminal with access to the service subsystems. The access subsystems may be radio networks.

At least part of the connection is preferably over a radio link. The network is preferably a cellular telephone network. The first or second telecommunications system is suitably operable according to the GSM protocol or a derivative thereof. Then the user terminal suitably transmits information indicative of its capabilities for communication with the service subsystem or access subsystem of that telecommunications system as GSM classmark 2 and/or 3 parameters. The other telecommunications system is suitably operable according to the UMTS protocol or a derivative thereof. Then the user terminal suitably transmits information indicative of its capabilities for communication with the service subsystem or access subsystem of that telecommunications system as UMTS access network and/or core network classmarks.

The user terminal is preferably incapable of transmitting capability data indicative of its capabilities for communication with at least one of the service subsystems without transmitting capability data indicative of its capabilities for communication with the access subsystems of the same system as that service subsystem. That system may be operable according to the GSM protocol or a derivative thereof. That capability data may be transmissible as GSM classmark 2 and/or 3 parameters. The user terminal is preferably capable of transmitting capability data indicative of its capabilities for communication with the other one of the service subsystems without transmitting capability data indicative of its capabilities for communication with the access subsystems of the same system as that service subsystem. That system may be operable according to the UMTS protocol or a derivative thereof. That capability data may be transmissible as UMTS access network and/or core network classmarks.

The connection may be capable of bearing a telephone call. The user terminal may be a mobile station. The user terminal may be a radio telephone.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will now be described by way of example with reference to the accompanying drawings, in which.

DETAILED DESCRIPTION OF THE PRESENTLY PREFERRED EMBODIMENTS

Figure 1:
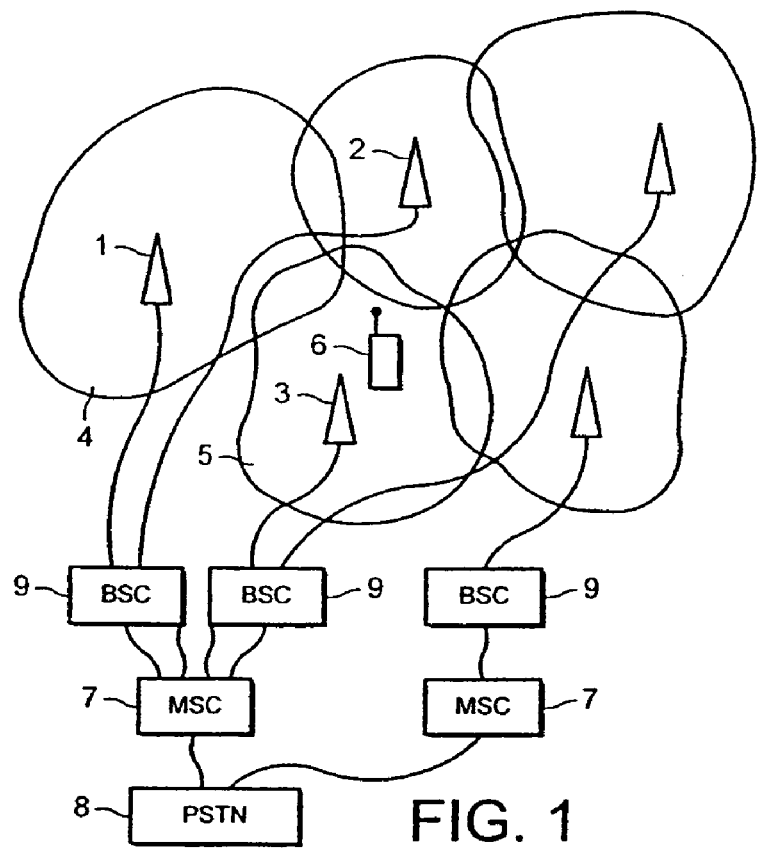
FIG. 1 shows schematically the configuration of a typical cellular radio telecommunications network.
Figure 2:
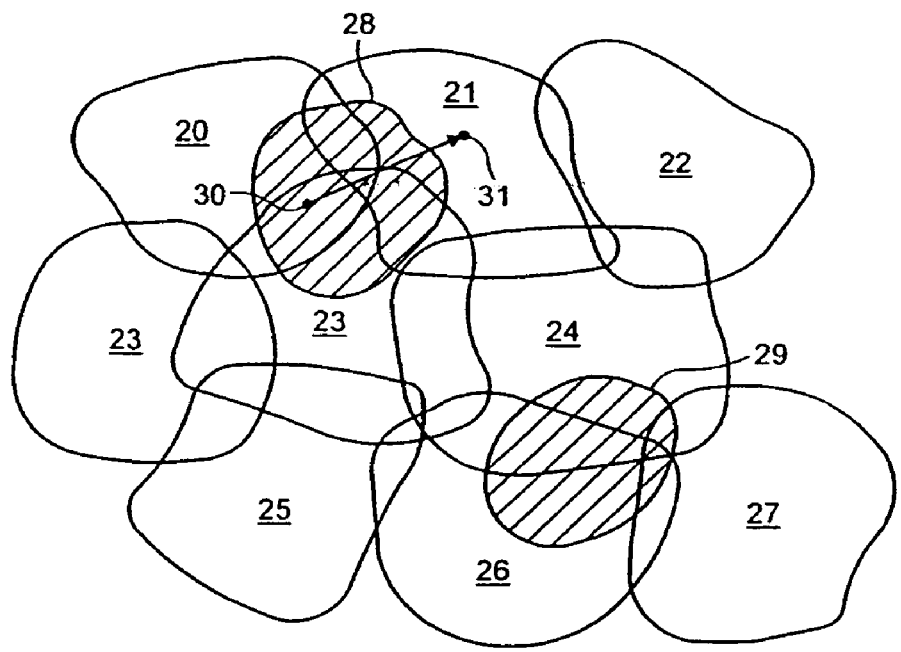
FIG. 2 shows coverage of two overlapping telecommunications networks.
Figure 3:
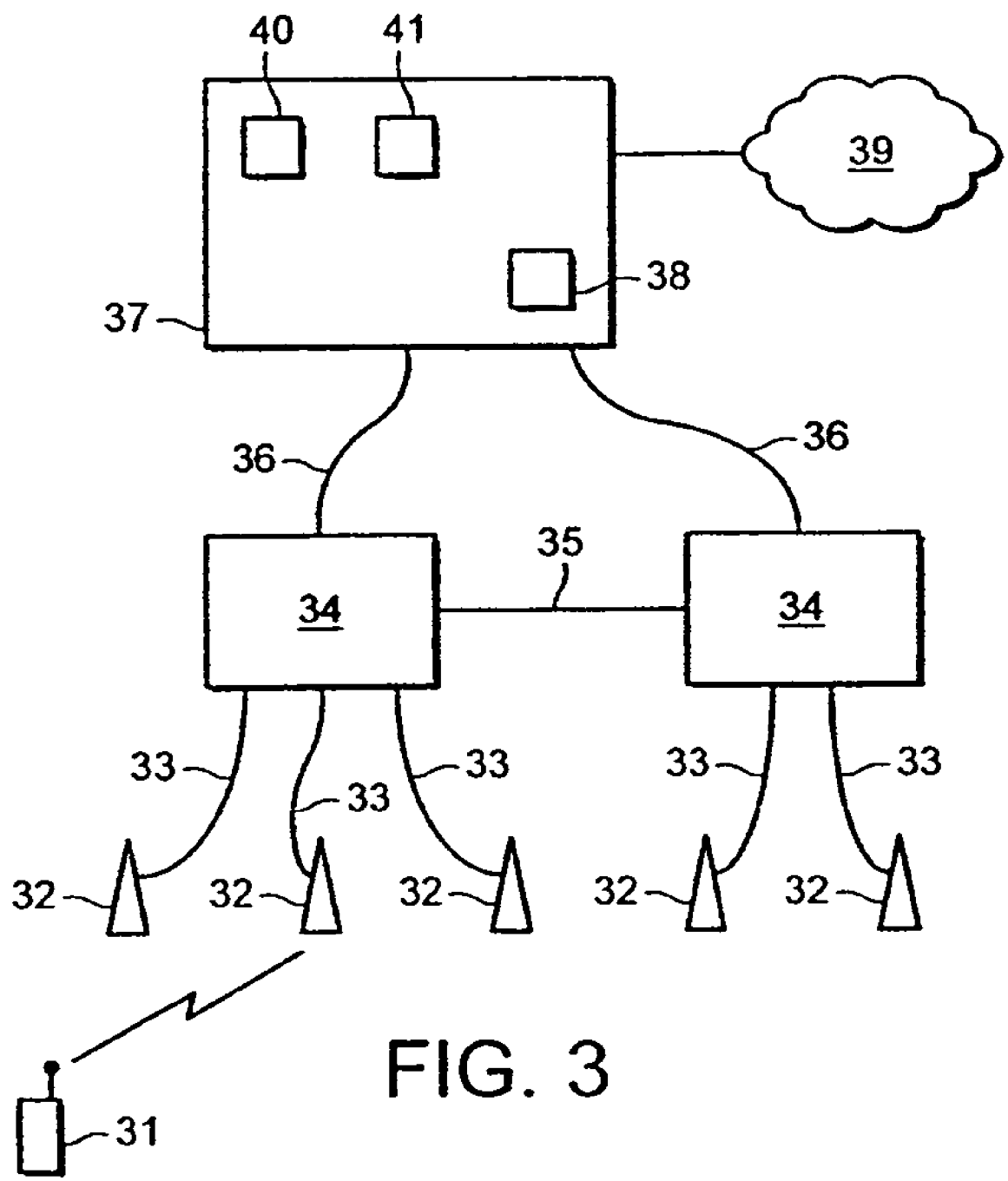
FIG. 3 illustrates the proposed architecture for UMTS.

FIG. 3 shows generally the architecture proposed for UMTS. A mobile station (MS) 31 can communicate by radio with one or more base stations (BS) 32. Each base station is linked by an Iub interface 33 to a single radio network controller (RNC) 34. Each RNC can be linked to one or more BSs. An RNC can be linked to another RNC by an Iur interface 35. Each RNC is linked by an Iu interface 36 to a core network (CN) 37. The CN includes one or more serving nodes that can provide communication services to a connected mobile station, for example a mobile switching centre (MSC) or a serving GPRS (general packet radio service) support node (SGSN) 38. These units are connected by the Iu interface to the RNCs. The CN is also connected to other telecommunications networks 39 such as fixed line networks or other mobile networks to allow onward connection of communications outside the UMTS network. The CN also includes other units such as a home location register (HLR) 40 and a visitor location register (VLR) 41 which help to control access to the network. The BSs and the RNCs and their interconnections constitute a UMTS terrestrial radio access network (UTRAN).

A mobile station can communicate with a core network via an RNC and a base station connected to that RNC. In soft handover (macrodiversity), the mobile station can send traffic communications via more than one base station. Those base stations may be connected to the same RNC or to different RNCs. If the base stations are connected to different RNCs then those RNCs communicate directly with each other via the Iur interface to co-ordinate their actions and to combine signals received from the mobile station. One of those RNCs is designated as the serving RNC and the others as drift RNCs. Communications between the user and the core network go via the serving RNC only. Thus, whether the mobile station is in soft handover or not its connection to the CN is through a single RNC. It can also arise in other circumstances than macrodiversity that a BS is controlled by a drift RNC, with communications going via serving a serving RNC to the core network.

When a mobile station is operating entirely in the UMTS system the access network (AC)—for example the BS and RNC that it is using to gain access to a core network (CN)—that it is using, and the core network that it is using are both of the UMTS system. When a mobile station is operating entirely in the GSM system the access network and the core network (insofar as they are split for the GSM system) are both of the GSM system. As a result of inter-system handover a mobile station may operate with an access network and a core network of different systems. In the latter circumstance the difference in the treatment of classmark information between the GSM and UMTS systems must be overcome.

FIGS. 4 to 7 below illustrate information flow in call setup and handover processes which aim to address the differences in the treatment of classmark information between the GSM and UMTS systems.

Figure 4:
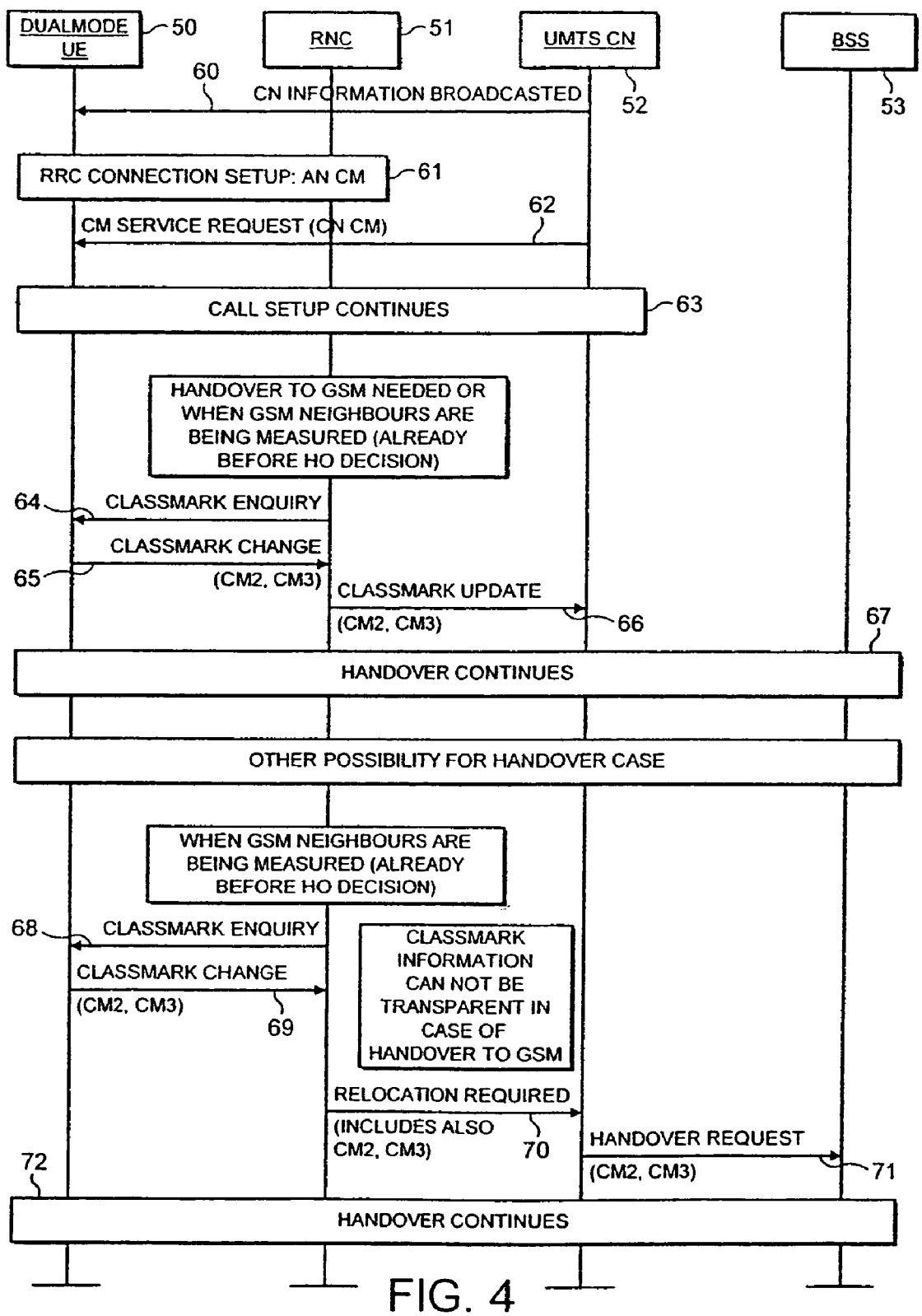
FIG. 4 illustrates information flow for call setup to a UMTS access network and UMTS core network and subsequent possible handover to an entity of a GSM system.

FIG. 4 illustrates information flow in a connection or call setup and handover process where the initial AN and the CN are both of the UMTS system. The entity indicated at 50 is the mobile station or user equipment (UE). In the scenarios of FIGS. 4 to 7 the user equipment is dual-mode user equipment which is capable of working with a GSM or UMTS system. The entity shown at 51 is a UMTS RNC. The entity indicated at 52 is a UMTS CN. The entity indicated at 53 is a GSM base station subsystem (BSS).

In the process of FIG. 4 it is first taken that the UMTS CN 52 broadcasts its capabilities (at 60) in accordance with current proposals for UMTS. The current proposal is that the type and the capabilities of the core network are broadcast on the broadcast control channel. Then, based on the capabilities indicated by the CN the UE determines which classmarks to send to the network. The UE should be able to determine whether the core network is based on a standard on or before the release 1998 GSM standard, or on a later standard: the MS core network classmark of the 1999 GSM standard will be the same as that of UMTS, but different from that of the 1998 and earlier GSM releases. In this case, in order to establish the UMTS AN connection the UE sends its AM classmarks as part of the RRC (radio resource connection) setup process between the UE and the RNC as indicated at 61. Then, to obtain service from a core network the UE makes a CM service request to the UMTS CN, indicating its core network classmark, as indicated at 62. Thereafter, call setup continues as normal (indicated at 63).

In the event that there is a need for a handover to the GSM system steps 64 to 67 are performed. A classmark enquiry message (at 64) is sent from the UMTS RNC to the UE. The UE responds with a classmark change message (at 65) indicating its GSM classmark 2 and 3 parameters. The RNC then informs the CN of those parameters with a classmark update message (at 66). Since the CN is then aware of all the UE's classmark information needed for operation in accordance with the GSM system handover to the GSM system may then take place as indicated at 67.

The process of steps 64 to 66 may also be performed as a prelude to measurement of signal quality or other parameters of a local GSM system in order to allow a decision to be made on whether to hand over the UE from the UMTS to the GSM system. An alternative process that may be used in those circumstances is illustrated by steps 68 to 72. A classmark enquiry message (at 68) is sent from the UMTS RNC to the UE. The UE responds with a classmark change message (at 69) indicating its GSM classmark 2 and 3 parameters. The RNC then sends a relocation required message to the CN, indicating that handover is to be made to the GSM system and including the UE's GSM classmark 2 and 3 parameters (at 70). Since the CN is then aware of all the UE's classmark information needed for operation in accordance with the GSM system it can send a handover request (at 71) to the GSM BSS and handover to the GSM system may then take place as indicated at 72.

Figure 5:
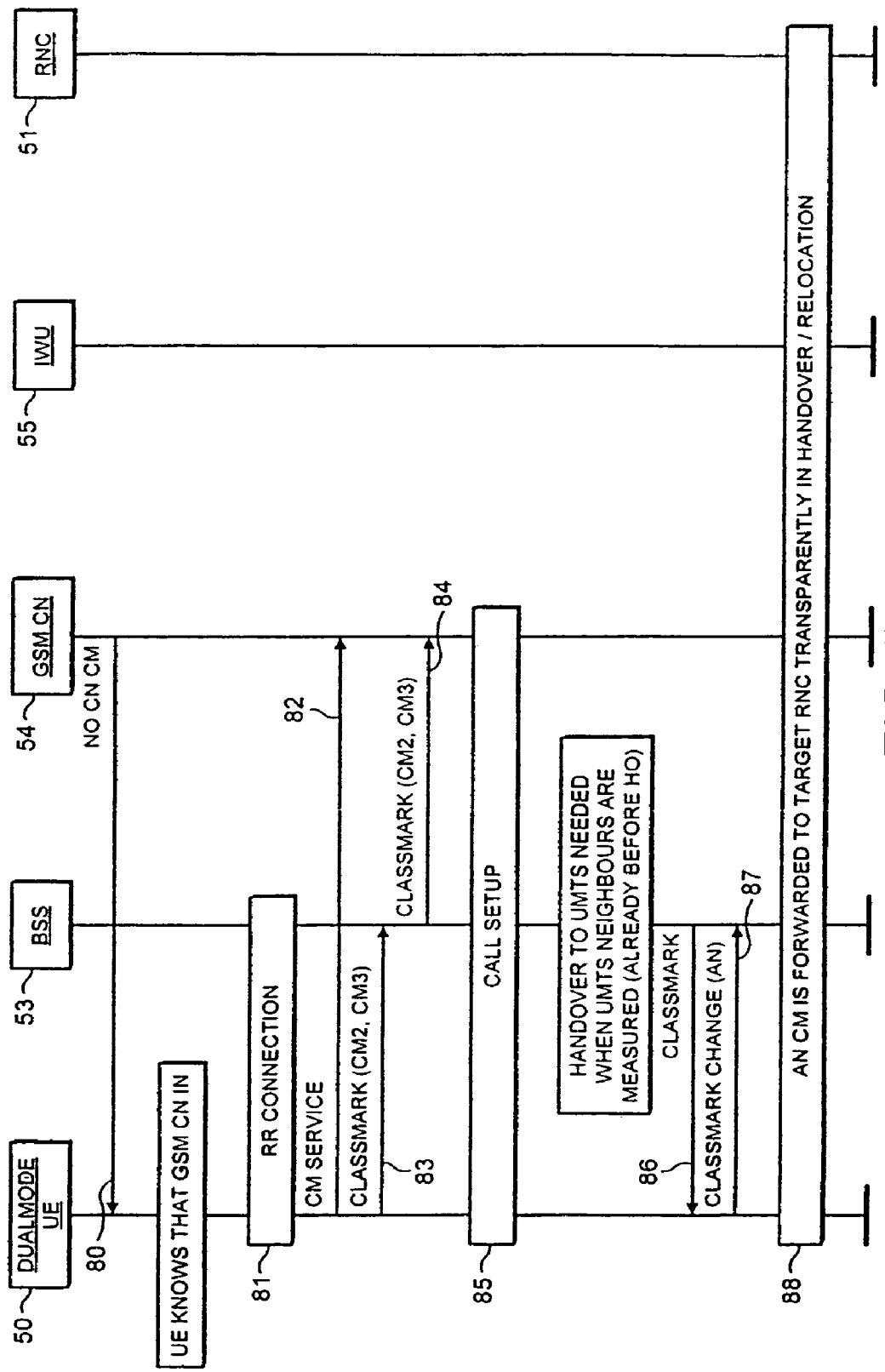
FIG. 5 illustrates information flow for call setup to a GSM access network and GSM core network and subsequent possible handover to an entity of a UMTS system.

FIG. 5 illustrates information flow in a connection or call setup and handover process where the initial AN is of the GSM system and the CN is of the GSM system. In order to be forwards compatible with the UMTS system the GSM CN must be provided with an interworking unit (IWU) to allow it to interwork with the newer UMTS system. This IWU functionality could also be included in some other network element, to eliminate a need for an additional network element. Entities 50, 51 and 53 are as shown in FIG. 4. Entity 54 is a GSM CN. Entity 55 is the GSM IWU.

In the process of FIG. 5, the first step in the establishment of a connection between the UE and the GSM AN is the broadcasting of a message (at 80) by the GSM BSC to indicate that the GSM CN is unaware of the necessary classmark information of the UE. In order to request or obtain a desired service the UE must first establish a radio resource (RR) connection between it and the GSM BSS. This step is indicated at 81. Then the UE can transmit a CM service message (at 82) to the GSM CN. The UE transmits its classmark information to the GSM BSS (at 83), which then forwards that information to the GSM CN for use there. Then a call can be set up as indicated at 85 between the UE and the GSM CN.

It is assumed for FIG. 5 that the dual mode UMTS/GSM UE supports classmark early sending, thus no classmark enquiry is needed.

In the event that there is a need for a handover to the UMTS system steps 86 to 88 are performed. A classmark enquiry message (at 86) is sent from the GSM BSS to the UE. The UE responds with a classmark change message (at 87) indicating its UMTS AN classmark. This AN classmark information can then be forwarded transparently to the target RNC to which the UE is to be handed over as part of the handover/relocation process as illustrated at 88. Thus, the GSM network need have no involvement in the transfer of the UMTS AN classmark to the UMTS network. Instead of the classmark information being sent in response to the message at 86 the UE could spontaneously send the information in response to a circumstance detected by it. In that case no change to the GSM RR (radio resource) classmark enquiry would be needed.

Figure 6:
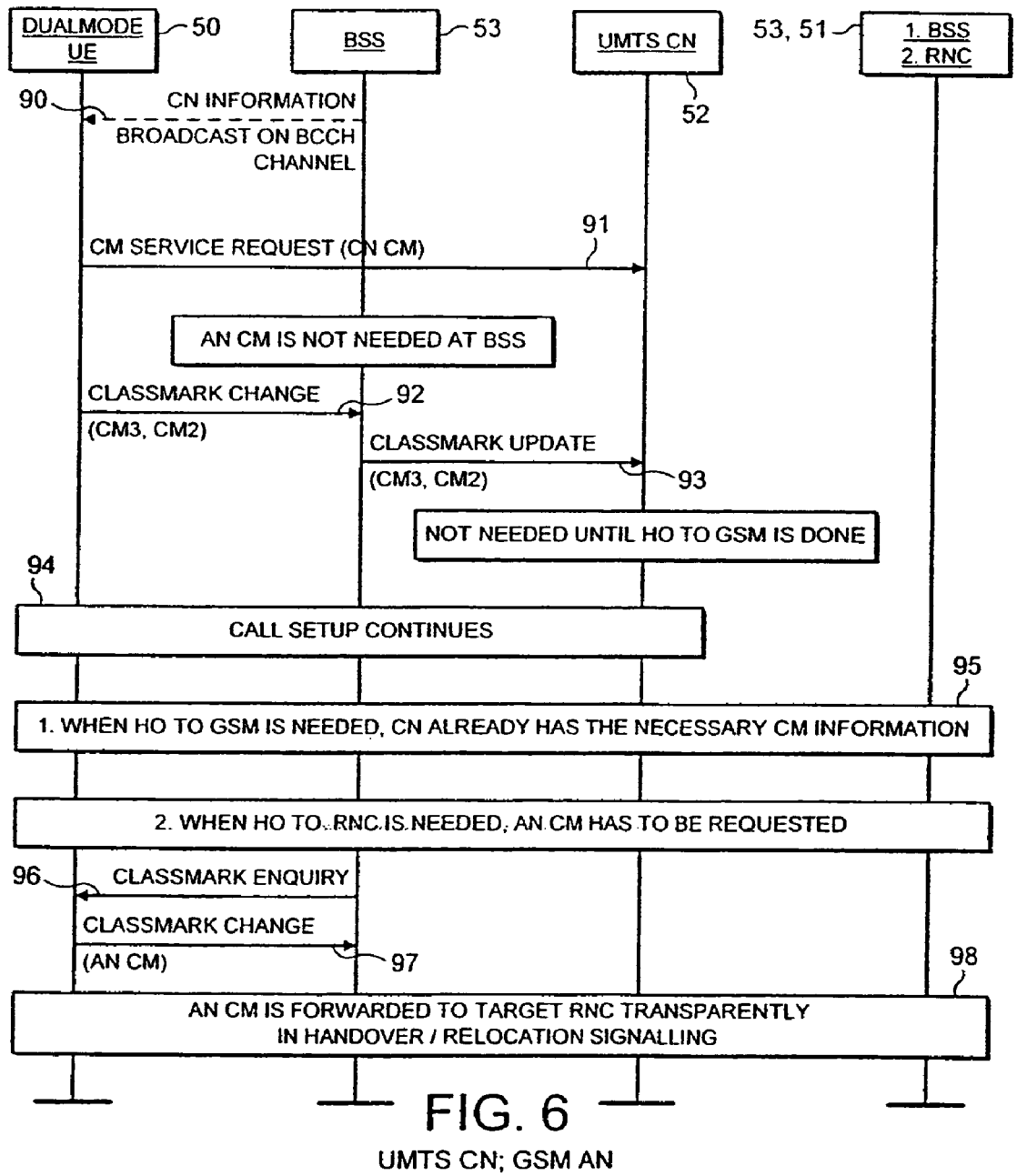
FIG. 6 illustrates information flow for call setup to a GSM access network and UMTS core network and subsequent possible handover to an entity of a GSM or UMTS system.

FIG. 6 illustrates information flow in a connection or call setup and handover process where the initial AN is of the GSM system and the CN is of the UMTS system. Entities 50 to 53 are as shown in FIGS. 4 and 5.

In the process of FIG. 6 it is again first taken that the UMTS CN 52 has had its capabilities broadcast (as illustrated at 90) in accordance with current proposals for UMTS. In this case the GSM BSS does not need an AM class mark. Therefore, the UE can transmit a CM service request (as shown at 91) to the UMTS CN, indicating the UMTS CN classmark. The UMTS CN is then able to operate with the UE for placement of calls. However, in order to allow for handover to the GSM system to be made the UE transmits a classmark change message (at 92), indicating its GSM classmark 2 and 3 parameters, to the GSM BSS, which then forwards the UE's GSM classmark 2 and 3 parameters to the UMTS CN with a classmark update message (at 93). (This scenario assumes that the BSC supports GSM release 1999 or a later standard—otherwise there would be a GSM classmark 2 parameter in the CM service request message). The UE's GSM classmark 2 and 3 parameters are then stored at the UMTS CN for later use, and the setup of a call between the UMTS CN and the UE over the GSM BSS continues as indicated at 94. The storing of the GSM classmark 2 and 3 parameters allows for backward compatibility of the UMTS system with GSM. The parameters are preferably stored at the UMTS MSC (mobile switching centre).

When a handover to the GSM CN or to another GSM BSC is needed the UMTS CN already has all the classmark information needed so the handover can be performed (as illustrated at 95) without further classmark information being supplied by the UE.

When a handover to the UMTS RNC is needed the AN classmark information must be obtained from the UE. This is illustrated at steps 96 to 98. The BSS makes a classmark enquiry message (at 96) to the UE. It is also possible that the UE automatically sends the UMTS classmark to the BSS when it gets an order from the BSS to start measuring neighboring UMTS cells. Then no specific classmark enquiry message would be needed. The UE returns a classmark change message (at 97) to the BSS, indicating its AN classmark. This AN classmark information can then be forwarded transparently to the target RNC to which the UE is to be handed over as part of the handover/relocation process as illustrated at 98.

Figure 7:
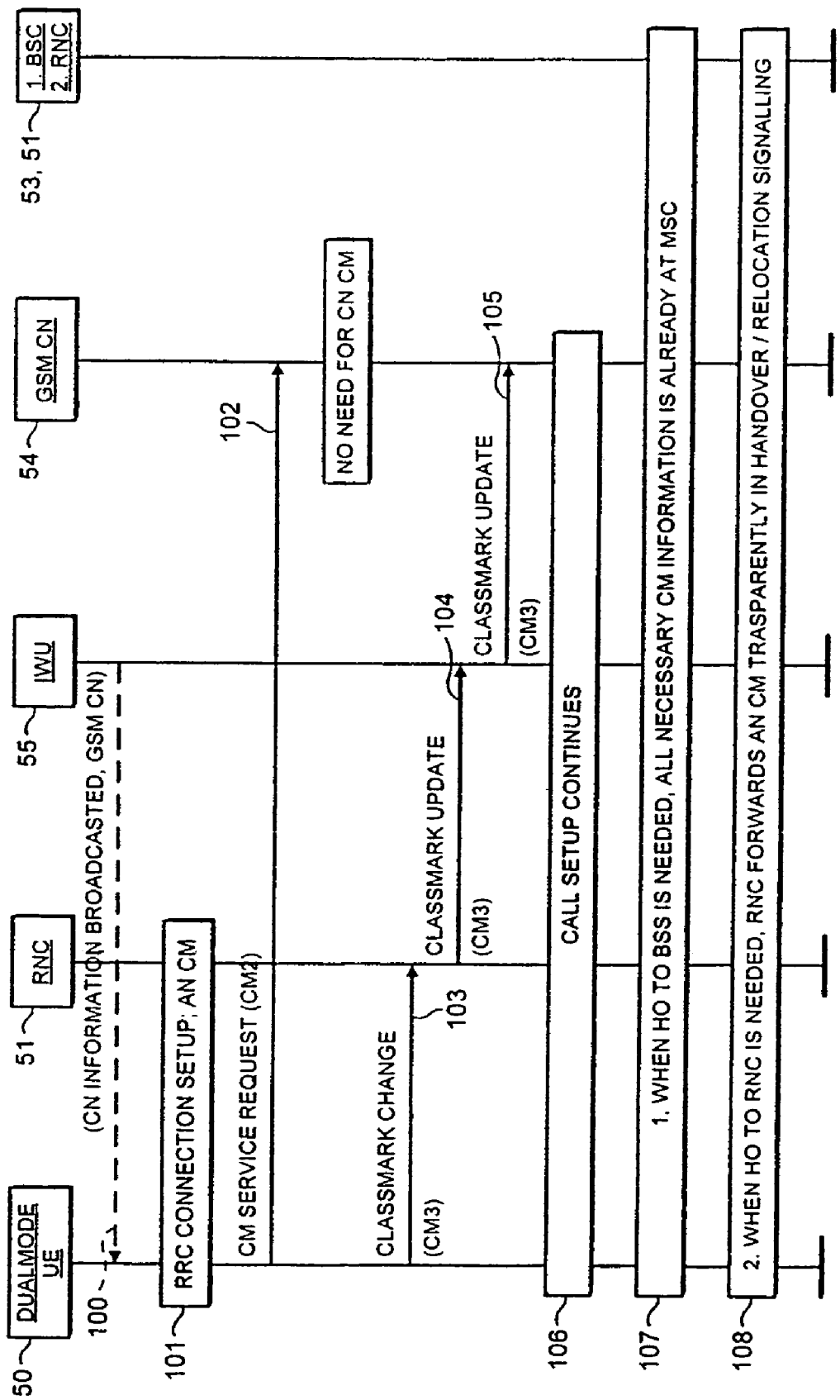
FIG. 7 illustrates information flow for call setup to a UMTS access network and GSM core network and subsequent possible handover to an entity of a GSM or UMTS system.

FIG. 7 illustrates information flow in a connection or call setup and handover process where the initial AN is of the UMTS system and the CN is of the GSM system (together with its IWU). Entities 50, 51 and 53 to 55 are as shown in FIGS. 4 to 6.

In the process of FIG. 7 it is again first taken that the core network capabilities are broadcast (as illustrated at 100), this time potentially under the influence of the IWU 55. This may be done by the RNC 51. A radio resource connection can be set up between the UE and the RNC (as illustrated at 101) in the normal way as proposed for UMTS, making use of the UE's AN classmark. Then a core network service request is made by the UE to the GSM CN (at 102), indicating the UE's GSM classmark 2 parameter. At this stage there is no need for the UE's CN classmark since it is not connecting to a UMTS CN. The UE's GSM classmark 3 parameter is, however, passed to the GSM CN by a series of messages as indicated at 103, 104 and 105. Then the process of call setup continues as illustrated at 106.

When a handover to the GSM BSS is needed the MSC of the GSM network already has the classmark information it needs to allow the handover to be performed.

When a handover to another (target) UMTS RNC is needed the AN classmark information can be forwarded transparently by the current RNC to the target RNC as part of the handover/relocation process as illustrated at 108.

In FIGS. 4 to 7 it is indicated that the initial information about the available core network is broadcast by a radio network controller (i.e. a BSC or RNC). In general such information to be broadcast would be configured in the radio network by the operator. In the scenarios of FIGS. 4 and 7 it is possible that the core network (the UMTS MSC and the IWU respectively) may provide additional information to be broadcast at run time. In situations where such broadcasting was not supported (for example in some potential GSM systems) the UE could itself request the initial information on the type or capabilities of the core network when establishing a connection; thus the UE would function as in the current GSM core network arrangements, and the UMTS system would generate a CN classmark from the received GSM CM2/CM3 information.

In each of the examples of FIGS. 4 to 7, the UE is capable of determining from its initial connection environment what classmark information it is required to send to the network in a message of the appropriate form. The required information at setup is summarized in the following table:

| Detected access network | Detected core network | Required classmark information |
|---|---|---|
| UMTS (RNC) | UMTS | UMTS AN (sent during RRC setup) UMTS CN (sent in CM service request) |
| UMTS (RNC) | GSM | UMTS AN (sent during RRC setup) GSM CM2 and CM3 (sent in classmark change) |
| GSM (BTS) | UMTS | UMTS CN (sent in CM service request) GSM CM2, CM3 (sent in classmark change) |
| GSM (BTS) | GSM | GSM CM2 (sent in CM service request) GSM CM3 (sent in classmark change) |

Thus, at call setup only the classmark information necessary to allow the call to be set up is sent. Then, if it later becomes evident, for example to a serving RNC or BSC (base station controller), that handover to another system is required the serving access network requests the mobile station for any additional classmark information that is needed to allow the handover request to be completed.

Whilst the above scenario indicates the UE and the AN as being the entities responsible for determining the required classmark information at each stage, other entities could, of course, perform the necessary determinations.

The system described above thus permits potentially unnecessary signalling of classmark parameters to be avoided.

As described above, in some circumstances the above system requires signalling of additional required classmark information to be performed before inter-system handover can take place. This may increase the amount of time required for an inter-system handover to take place. To avoid at least some such delays the system could be arranged so that under certain conditions the additional required classmark information is signaled from the user equipment to the network before a decision to initiate a handover is made. Those conditions are preferably (but not necessarily) a based on the same factors used to determine when to initiate a handover, but with a threshold that is closer to the level experienced during normal operation of the system, so as to act to anticipate the possibility of a handover subsequently being required. For example, it may be that handover is initiated when the signal to interference ratio (SIR) on one or more links between a first base station and the mobile station falls below that on one or more links between a second base station and the mobile station by more than a predetermined amount x. In that case signalling of additional required classmark information may take place when the signal to interference ratio (SIR) on one or more links between the first base station and the mobile station falls below that on one or more links between the second base station and the mobile station by more than a predetermined amount which is less than x. Similar approaches may be taken when initiation of handover is determined on the basis of other factors such as the load on base stations or other pieces of network equipment, or received power levels fall to certain levels. The aim in each case is for the threshold at which transfer of the necessary classmark information takes place to be set at a level closer to that encountered in normal (e.g. high signal quality or low network load) use so that that threshold is reached before the threshold at which handover is triggered. Then, the necessary information can in many cases be available to the network when handover itself is initiated.

Figure 8:
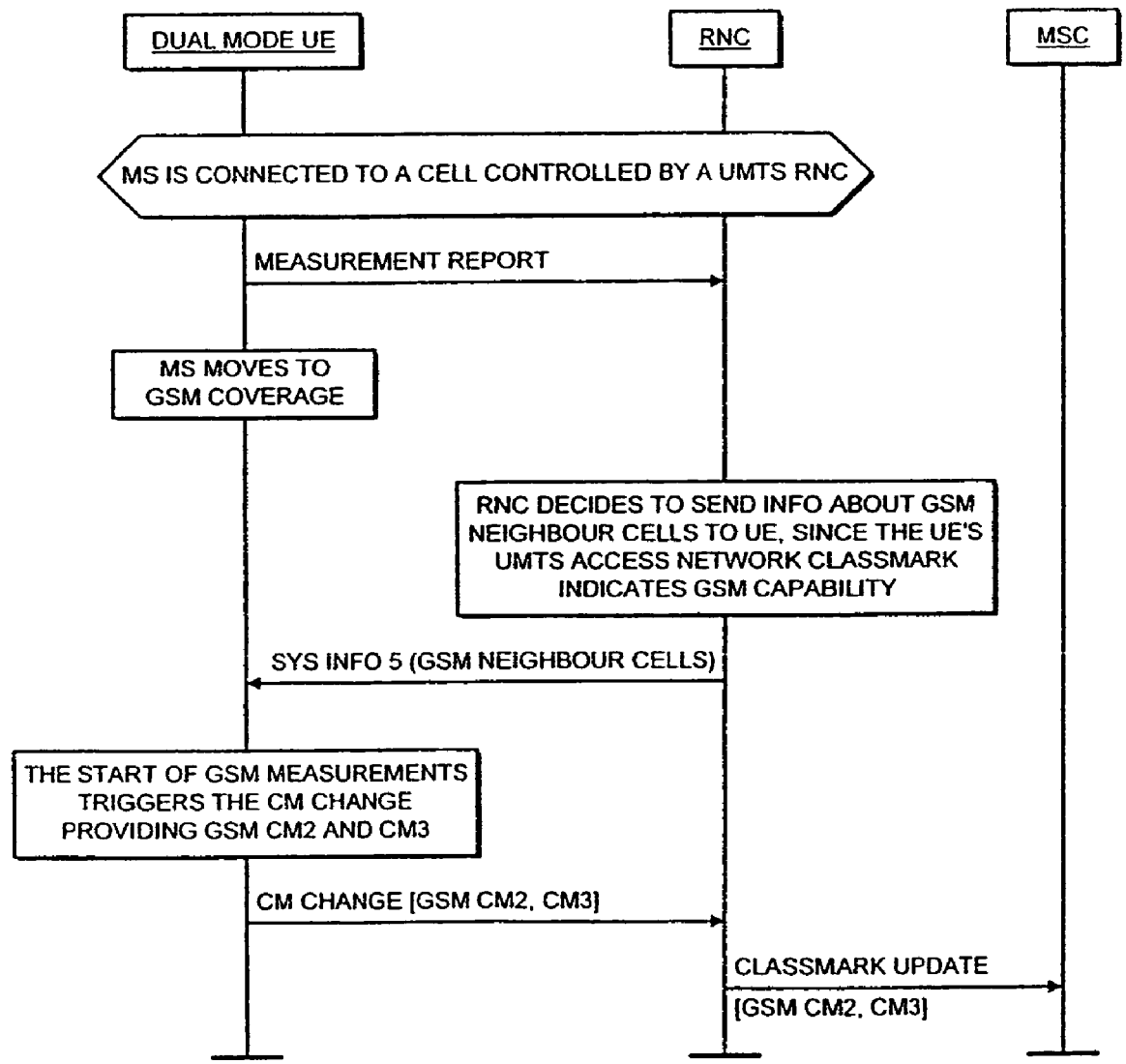
FIG. 8 illustrates information flow in anticipation of a handover to a GSM radio access system.

The mobile station could send the remaining classmark information that is needed to effect a handover spontaneously when it anticipates that a handover may occur or in response to a request from the network side. When a mobile station receives a message which causes it to measure neighbor cells belonging to a different type of radio access network, or when it itself detects signals from such a network. For example, the MS may be connected to the UTRAN and then at some point in time the RNC may decide that the MS should start to measure GSM neighbor cells and sends a measurement control message to the MS. The reception of this message could trigger the MS to send the GSM access network classmark to the UMTS RNC. This process is illustrated in FIG. 8. In the process of FIG. 8, the user equipment or mobile station is initially connected to the UMTS access system. When it moves to GSM coverage and receives a message from the UMTS RNC indicating that measurement of signals from the GSM network should begin, the start of GSM measurement triggers the UE to send the classmark information that would be needed for a handover to the GSM system, i.e. the GSM parameter 2 and 3 classmarks. An analogous similar process could occur when the unit is connected to a GSM network and moves to an area of UMTS coverage.

The principles described above are, of course, applicable in other networks than GSM and UMTS, although they are preferably applied in those networks or derivatives thereof. The principles described above could also be used for the transfer of information other than classmark information, although preferably information usable in the establishment of a call to an item of user equipment.

The present invention may include any feature or combination of features disclosed herein either implicitly or explicitly or any generalization thereof, irrespective of whether it relates to the presently claimed invention. In view of the foregoing description it will be evident to a person skilled in the art that various modifications may be made within the scope of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:
   transmitting initial capability data indicative of a capability of a user terminal to communicate with a first service subsystem of a first telecommunications system operable according to a first protocol and one of a first access subsystem of the first telecommunications system and a second access subsystem of a second telecommunications system operable according to a second protocol from the user terminal to one of the first and second access subsystems;
   establishing at the user terminal a connection to the first service subsystem via one of the first and second access subsystems;
   transmitting from the user terminal to a telecommunications network further capability data indicative of the capability of the user terminal to communicate with a second service subsystem of the second telecommunications network or the other of the first and second access subsystems to enable a handover of the connection via the further capability data.

2. The method of claim 1, wherein the capability data is classmark information.

3. The method of claim 1, further comprising monitoring at least one condition indicative of a need for the handover, and initiating the transmitting by the user terminal of the further capability data when the condition exceeds a first threshold.

4. The method of claim 3, wherein the condition is based on a signal to interference ratio of the connection.

5. The method of claim 4, wherein the initiating the transmitting by the user terminal of the further capability data is performed when the signal to interference ratio is less than the first threshold.

6. The method of claim 1, further comprising monitoring at least one condition indicative of a need for the handover, and initiating the handover when the condition exceeds a second threshold.

7. The method of claim 6, wherein the second threshold exceeds a first threshold.

8. The method of claim 1, wherein the first and second service subsystems are configured to provide telecommunications service to the user terminal.

9. The method of claim 1, wherein the first and second access subsystems are configured to provide the user terminal with access to the first and second service subsystems.

10. The method of claim 1, wherein the first telecommunications system is operable according to the GSM protocol or a derivative thereof.

11. The method of claim 10, wherein the user terminal transmits information indicative of the user terminal's capabilities for communication with at least one of the first service subsystem and the first access subsystem as GSM classmark 2 or 3 parameters.

12. The method of claim 1, wherein the first telecommunications system is operable according to the UMTS protocol or a derivative thereof.

13. The method of claim 12, wherein the user terminal transmits information indicative of the user terminal's capabilities for communication with at least one of the first service subsystem and the first access subsystem as at least one of a UMTS access network classmark and a core network classmark.

14. An apparatus, comprising:
   a storer configured to store capability data indicative of a capability of the apparatus to communicate with a first service subsystem of a first telecommunications system operable according to a first protocol and a second service subsystem of a second telecommunications system operable according to a second protocol, and a first access subsystem of the first telecommunications system and a second access subsystem of the second telecommunications system;
   a sender configured to send initial capability data indicative of the capability of the apparatus to communicate with the first service subsystem and one of the first and second access subsystems from the apparatus to one of the first and second access subsystems;
   a processor configured to establish a connection to the first service subsystem via one of the first and second access subsystems based on the initial capability data;
   the sender being configured to send to the network further capability data indicative of the capability of the apparatus to communicate with the second service subsystem or the other of the first and second access subsystems to allow a handover of the connection via the further capability data.

15. The method of claim 2, further comprising the steps of monitoring at least one condition indicative of a need for the said handover, and initiating the said transmission by the user terminal of the further capability data when the condition exceeds a threshold.

16. The apparatus of claim 14, wherein the first telecommunications system is operable according to the GSM protocol or a derivative thereof.

17. The apparatus of claim 14, wherein the apparatus transmits information indicative of the apparatus's capabilities for communication with at least one of the first service subsystem and the first access subsystem as GSM classmark 2 or 3 parameters.

18. The apparatus of claim 14, wherein the first telecommunications system is operable according to the UMTS protocol or a derivative thereof.

19. The apparatus of claim 14, wherein the apparatus transmits information indicative of the apparatus's capabilities for communication with at least one of the first service subsystem and the first access subsystem as at least one of a UMTS access network classmark and a core network classmark.

20. A communication system comprising:
   a first telecommunications system operable according to a first protocol and comprising: a first service subsystem and a first access subsystem;
   a second telecommunications system operable according to a second protocol and comprising: a second service subsystem and a second access subsystem;
   a user terminal arranged to:
     store capability data indicative of a capability of the user terminal to communicate with the service subsystems and the access subsystems,
     transmit to one of the first and second access subsystems initial capability data indicative of the capability of the user terminal to communicate with the first service subsystem and one of the first and second access subsystems, and in response to a determination that a handover of a connection is to be performed from the first service subsystem to the second service subsystem or from one of the first and second access subsystems to the other of the first and second access subsystems, transmit to a telecommunications network further capability data indicative of the capability of the user terminal to communicate with the second service subsystem or the other of the first and second access subsystems.

* * * * *